(12) United States Patent
Stuler (10) Patent No.: US 8,755,199 B2
(45) Date of Patent: Jun. 17, 2014

(54) CONTROL CIRCUIT FOR A RESONANT CONVERTER OR THE LIKE AND METHOD THEREFOR

(75) Inventor: Roman Stuler, Karolinka (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 80 days.

(21) Appl. No.: 13/527,800

(22) Filed: Jun. 20, 2012

(65) Prior Publication Data

US 2013/0343096 A1 Dec. 26, 2013

(51) Int. Cl.
*H02M 3/335* (2006.01)
(52) U.S. Cl.
USPC ...................................................... 363/21.02
(58) Field of Classification Search
USPC ........ 363/16, 21.02, 21.03, 21.05, 21.13, 131
See application file for complete search history.

(56) References Cited

U.S. PATENT DOCUMENTS

| | | | |
|---|---|---|---|
| 6,960,893 B2 * | 11/2005 | Yoshida et al. | 318/127 |
| 7,881,084 B2 * | 2/2011 | Lin | 363/98 |
| 8,284,571 B2 * | 10/2012 | Colbeck et al. | 363/21.02 |
| 8,300,429 B2 * | 10/2012 | Orr et al. | 363/21.02 |
| 8,582,319 B2 * | 11/2013 | Reinberger et al. | 363/16 |
| 8,587,280 B2 * | 11/2013 | Colbeck et al. | 323/282 |
| 2013/0121037 A1 * | 5/2013 | Peng et al. | 363/21.03 |

OTHER PUBLICATIONS

STMicroelectronics; "High-voltage resonant controller"; Data Sheet; 2009; 36 Pages; L6599; STMicroelectronics.
Bo Yang; "Topology Investigation of Front End DC/DC Converter for Distributed Power System", Chapter 4, "LLC Resonant Converter"; PhD Dissertation; 2003; pp. 94 to 141.
Infineon Technologies AG; "Half-Bridge Resonant Controller"; Data Sheet; Aug. 24, 2009; 18 Pages; ICE1HS01G, Version 2.0; Infineon Technologies AG, 81726 Munich, Germany.
Fairchild Semiconductor Corporation; "PFM Controller for Half-Bridge Resonant Converters"; Data Sheet; Jul. 2010; 17 Pages; FAN7621, Rev. 1.0.3; Fairchild Semiconductor Corporation; 3030 Orchard Parkway San Jose, CA 95134 U.S.A.
Semiconductor Components Industries, LLC; "High Performance Resonant Mode Controller with Integrated High-Voltage Drivers"; Data Sheet; Nov. 2011; 27 Pages; NCP1397A, NCP1397B, NCP1397/D, Rev. 4; Semiconductor Component Industries, LLC, P.O. Box 5163, Denver, CO 80217 U.S.A.
Texas Instruments Incorporated; "8-Pin High-Performance Resonant Mode Controller"; Data Sheet; Jul. 2011; 24 Pages; UCC25600, SLUS846B; Texas Instruments Incorporated, P.O. Box 655303, Dallas, TX 75265 U.S.A.

* cited by examiner

*Primary Examiner* — Adolf Berhane
(74) *Attorney, Agent, or Firm* — Polansky & Associates, P.L.L.C.; Paul J. Polansky (57) ABSTRACT

An integrated circuit includes a first pin for receiving a feedback signal, a second pin for receiving a current signal indicative of a current in a primary of a transformer, and a switching circuit coupled to the first and second pins and responsive to the feedback signal to determine a frequency at which to provide an upper drive signal and a lower drive signal, and further responsive to the current signal to change a value of the feedback signal when the current signal exceeds a first threshold, and to stop providing the upper and lower drive signals when the current signal exceeds a second threshold, the second threshold higher than the first threshold.

20 Claims, 4 Drawing Sheets

CONTROL CIRCUIT FOR A RESONANT CONVERTER OR THE LIKE AND METHOD THEREFOR

FIELD OF THE DISCLOSURE

The present disclosure relates generally to power controllers, and more particularly relates to a control circuit for a resonant converter or the like.

BACKGROUND

A resonant converter is a switching power converter in which a resonant tank circuit operating at a relatively high frequency is used to transfer energy to the output. A resonant converter application generally includes a control circuit including an integrated circuit to control a high efficiency power stage. The integrated circuit drives the power stage transistors, provides light load operation control, and provides other useful control functions. At the same time, system cost pressure has led to increasing requirements for lower pin count integrated circuits that provide these control functions.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION

Figure 1:
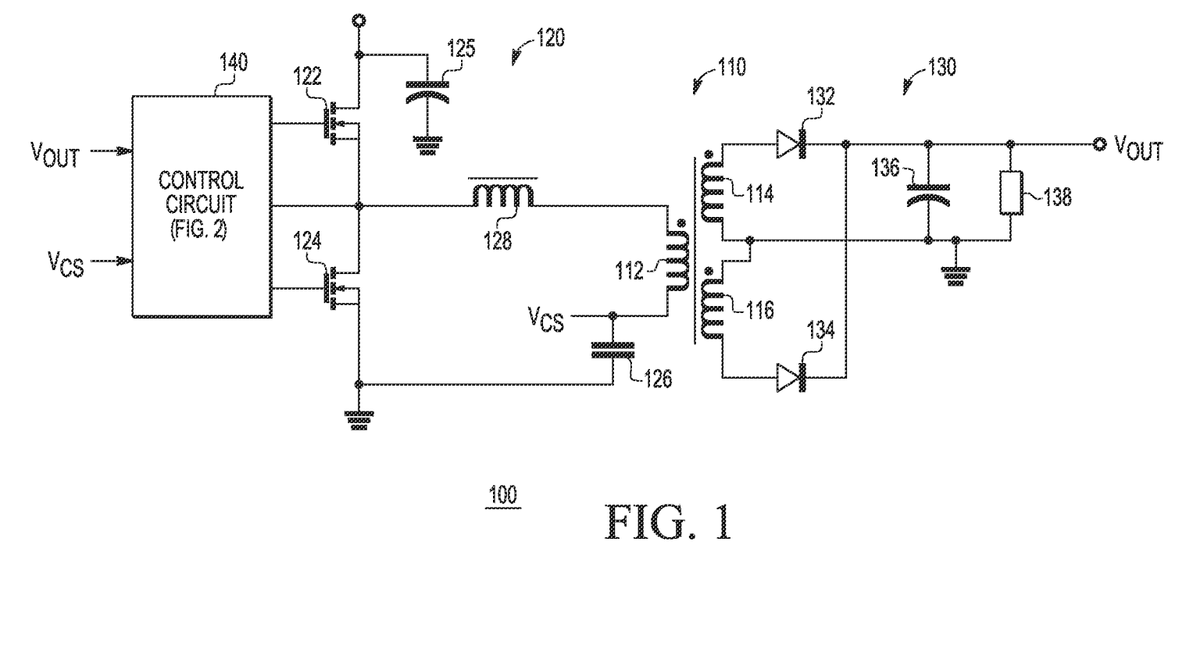
FIG. 1 illustrates in partial block diagram and partial schematic form an inductor-inductor-capacitor ("LLC") resonant converter according to embodiments of the present invention.

FIG. 1 illustrates in partial Hock diagram and partial schematic form an inductor-inductor-capacitor ("LLC") resonant converter 100 according to embodiments of the present invention. LLC resonant converter 100 generally includes a transformer 110, a primary circuit 120, a secondary circuit 130, and a control circuit 140.

Transformer 110 includes a primary winding 112, a secondary winding 114, and a secondary winding 116. Primary winding 112 has a first terminal connected to a first terminal of resonant inductor 128 and a second terminal for providing a voltage labeled "$V_{CS}$". Primary winding 112 is inductively coupled to a secondary winding 114 and a secondary winding 116. Secondary winding 114 has a first terminal connected to an anode of diode 132 and a second terminal connected to a power supply ground terminal. Secondary winding 116 has a first terminal connected to the power supply ground terminal and a second terminal connected to an anode of diode 134.

Primary circuit 120 includes an upper transistor 122, a lower transistor 124, a decoupling capacitor 125, a resonant capacitor 126, and a resonant inductor 128. Transistor 122 has a gate electrode connected to an upper output of control circuit 140, drain electrode connected to a power supply voltage terminal, and a source electrode connected to a HB output of control circuit 140 and a drain electrode of transistor 124 and a second electrode of resonant inductor 128. Transistor 124 has a gate electrode connected to a lower output of control circuit 140 and a source electrode connected to the power supply ground terminal. Decoupling capacitor 125 has a first electrode connected to the power supply voltage terminal and a second electrode connected to the power supply ground terminal. Resonant capacitor 126 has a first terminal connected to the second terminal of primary winding 112, and a second terminal connected to the power supply ground terminal.

Secondary circuit 130 includes a secondary diode 132, a secondary diode 134, a secondary filtering capacitor 136, and a secondary load resistor 138. Diode 132 has a cathode for providing a signal labeled "$V_{OUT}$". Secondary filtering capacitor 136 has a first terminal connected to the cathode of diode 132 and a second terminal connected to the power supply ground terminal. Secondary load resistor 138 has a first terminal connected to the cathode of diode 132 and a second terminal connected to the power supply ground terminal.

Control circuit 140 has a first input for receiving "$V_{OUT}$" and a second input for receiving "$V_{CS}$", and upper and lower outputs connected to the gates of transistors 122 and 124, respectively.

In operation, for transformer 110, a varying alternating current through primary winding 112 creates a varying magnetic flux in the core of transformer 110 that results in a varying alternating voltage across primary winding 112. By inductive coupling, the varying magnetic flux creates a varying magnetic field in the coils of secondary winding 114 and secondary winding 116. As is known, the voltages induced in the secondary windings are mathematical functions of the voltage across primary winding 112 and are defined by a ratio of the number of turns in secondary windings 114 and 116, respectively, to the number of turns in primary winding 112. Current will flow through secondary load 138 in response to the voltages induced in secondary windings 114 and 116.

For primary circuit 120, the circuit formed by transistor 122 and transistor 124 provides a varying alternating current that further provides an induced alternating voltage across primary winding 112 and a resonant tank circuit formed by resonant capacitor 126 and resonant inductor 128. As a varying alternating current flows through secondary winding 114 and secondary winding 116, the secondary windings reflect an impedance back to primary circuit 120. Resonant capacitor 126, resonant inductor 128, and the reflected toad operate to divide the induced alternating voltage and produce a maximum voltage across primary winding 112 when the resonant tank circuit operates at its resonant frequency. The resonant frequency is the operating point where the resonant tank circuit realizes maximum gain and the imaginary parts of the impedances due to the reactive components of the circuit cancel each other. The resonant frequency is also the operating point where primary winding 112 transfers maximum energy to secondary winding 114 and secondary winding 116.

However, a frequency shift away from the resonant frequency is sometimes used to compensate for light secondary loading or unexpected operating conditions such as overload currents flowing in primary circuit 120 or secondary circuit 130 connected to transformer 110. As the frequency shifts, less energy is efficiently transferred from primary circuit 120 to secondary circuit 130. $V_{CS}$, used by additional circuits to compensate for such conditions, provides feedback as an indication of the current through primary winding 112, or the voltage across primary winding 112, under various operating conditions and frequency changes.

Depending on the direction of the alternating current flowing through secondary circuit 130, the voltage across secondary winding 114, or alternately secondary winding 116, will rise to the point where secondary diode 132, or alternately secondary diode 134 conducts current. The current flows through secondary filtering capacitor 136 and secondary load resistor 138 to form "$V_{OUT}$". LLC resonant converter 100 regulates the value of $V_{OUT}$ and provides $V_{OUT}$ as a feedback voltage to additional circuitry to compensate for operational conditions. $V_{OUT}$ provides a direct indication of the operating conditions of secondary circuit 130.

Although known resonant converters are generally latched-off during overload and overcurrent conditions, control circuit 140 provides a choice between modes that continue operation and modes that latch off resonant converter 100. Operating with information provided by feedback inputs $V_{OUT}$ and $V_{CS}$, control circuit 140 provides regulation of circuit alternating currents and circuit alternating voltages, to provide control of the operating frequency of LLC resonant converter 100. Also, control circuit 140 provides adjustable frequency shift, reaction time, and frequency shift depth and provides overload protection ("OLP") and overcurrent protection ("OCP") during overload and overcurrent conditions, respectively. Control circuit 140 further provides improved regulation of the current of primary circuit 120 to a safe level during overload and overcurrent events, and protection for strong transient overloading and other short circuit conditions that can occur in secondary circuit 130.

Figure 2:
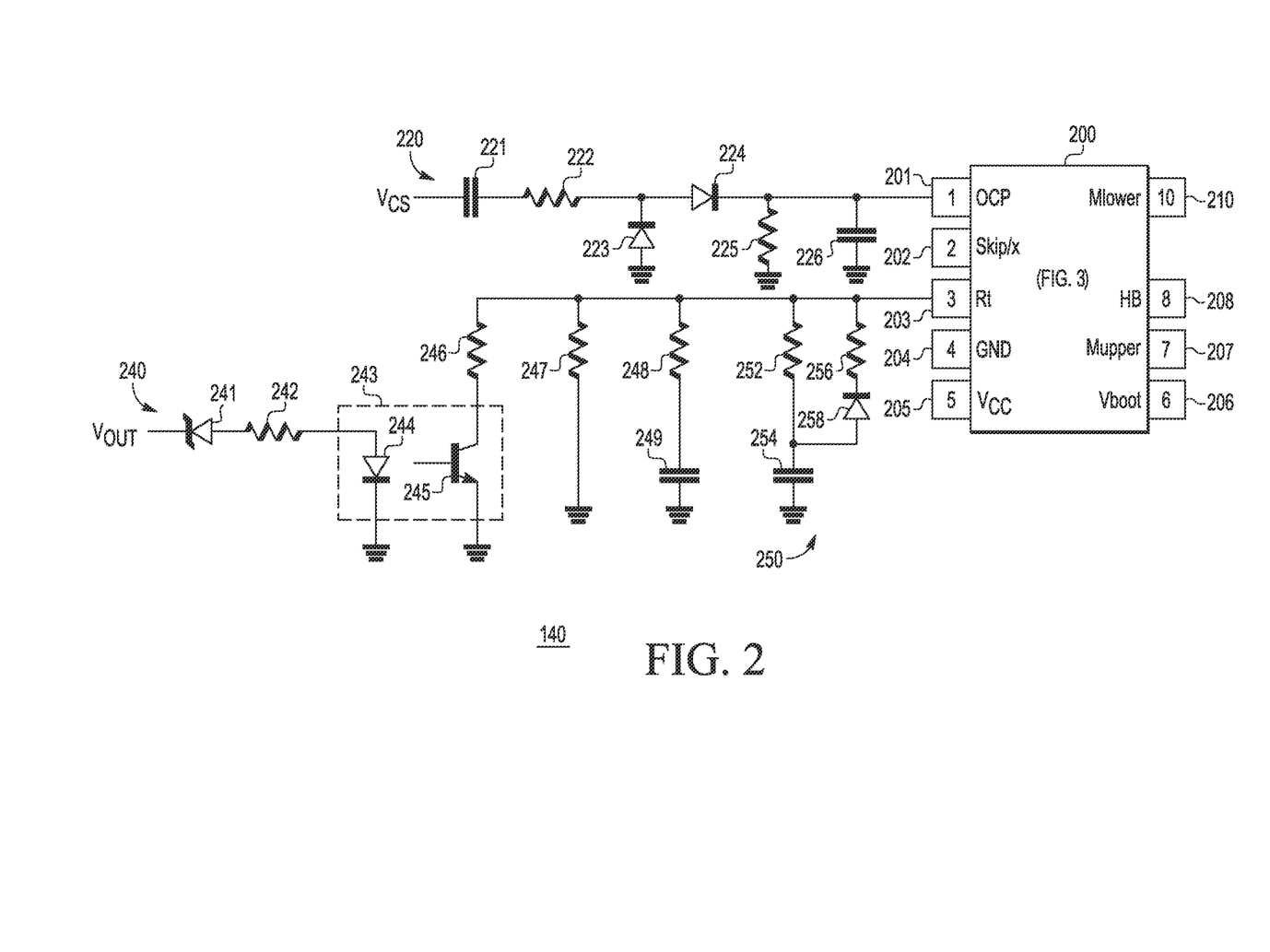
FIG. 2 illustrates in partial block diagram and partial schematic form a control circuit for the LLC resonant converter of FIG. 1.

FIG. 2 illustrates in partial block diagram and partial schematic form control circuit 140 of LLC resonant converter 100 of FIG. 1. Control circuit 140 generally includes an integrated circuit 200, an OCP circuit 220, a $V_{OUT}$ regulation circuit 240, and an OCP network 250.

Integrated circuit 200 includes a first terminal 201 labeled "OCP", a second terminal 202 labeled "Skip/x", a third terminal 203 labeled "Rt", a fourth terminal 204 labeled "GND", a fifth terminal 205 labeled "$V_{CC}$", a sixth terminal 206 labeled "Vboot", a seventh terminal 207 labeled "Mupper", an eighth terminal 208, labeled half bridge connection ("HB"), a ninth unused terminal (not shown in FIG. 2), and a tenth terminal 210, labeled "Mlower". Terminal 201 is connected to a cathode of diode 224, a first terminal of resistor 225, and a first terminal of capacitor 226. Terminal 203 is connected to a first terminal of resistor 246, a first terminal of resistor 247, a first terminal of resistor 248, a first terminal of resistor 252, and a first terminal of resistor 256.

OCP circuit 220 includes a capacitor 221, a resistor 222, a diode 223, a diode 224, a resistor 225, and a capacitor 226. Capacitor 221 has a first terminal for receiving $V_{CS}$ and a second terminal connected to a first terminal of resistor 222. Resistor 222 has a second terminal connected to a cathode of diode 223 and an anode of diode 224. Diode 223 has an anode connected to the power supply ground terminal. Resistor 225 has a second terminal connected to the power supply ground terminal. Capacitor 226 has a second terminal connected to the power supply ground terminal.

$V_{OUT}$ regulation circuit 240 includes a zener diode 241, a resistor 242, an optocoupler 243, a resistor 246, a resistor 247, a resistor 248, and a capacitor 249. Optocoupler 243 includes a light emitting diode ("LED") 244 and a phototransistor 245. Zener diode 241 has a cathode for receiving "$V_{OUT}$" and an anode connected to a first terminal of resistor 242. Resistor 242 has a second terminal connected to an anode of LED 244.

LED 244 has a cathode connected to the power supply ground terminal and a light source optically coupled to a base terminal of phototransistor 245. Phototransistor 245 has a collector terminal connected to a first terminal of resistor 246 and an emitter terminal connected to the power supply ground terminal. Resistor 247 has a second terminal connected to the power supply ground terminal. Resistor 248 has a second terminal connected to a first terminal of Css capacitor 249. Capacitor 249 has a second terminal connected to the power supply ground terminal.

OCP network 250 includes a resistor 252, a capacitor 254, a resistor 256, and a diode 258. Resistor 252 has a second terminal connected to a first terminal of capacitor 254 and an anode of diode 258. Capacitor 254 has a second terminal connected to the power supply ground terminal. Diode 258 has a cathode connected to a first terminal of resistor 256.

in operation, control circuit 140 generally implements OLP and OCP while controlling reaction time and frequency shift depth adjustment. Integrated circuit 200 provides several functions, including drive for transistor 122 and transistor 124, on-chip circuitry cooperation with off-chip circuitry to provide OLP and OLC, auto recovery, fault latch off, brown out protection, soft start, and control under light load conditions of secondary circuit 130.

Integrated circuit 200 provides terminal 203 current using a track and hold system that filters noise present on terminal 203 when the voltage of terminal 208 transitions. Terminal 208 provides a return path for upper MOSFET driver pin 207 during periods when the common node formed by the source of upper transistor 122 and the drain of lower transistor 124 is floating. Terminal 202 restarts LLC resonant converter 100 without a soft start sequence. Terminal 206 is capacitively coupled to terminal 208 to provide a bootstrap power supply. Integrated circuit 200 has only nine functional pins and is implemented in a 10-pin semiconductor package.

Via capacitor 221 and resistor 222, OCP circuit 220 receives $V_{CS}$ from primary winding 112 and alternating current ("AC") couples $V_{CS}$ to diode 223 and diode 224. Diode 223 and diode 224 rectify $V_{CS}$ and provide the rectified version of $V_{CS}$ to resistor 225 and capacitor 226. Resistor 225 and capacitor 226 sense and store the conditioned $V_{CS}$ at terminal 201 for sensing by integrated circuit 200.

Based on the current flowing out of terminal 203, as a function of circuitry cooperating off chip and on chip at terminal 203, control circuit 140 generally provides control of frequency shifting during overload and short circuit conditions. $V_{OUT}$ regulation circuit 240 receives feedback $V_{OUT}$ and provides $V_{OUT}$ to the series topology of zener diode 241 and resistor 242. Zener diode 241 and resistor 242 provide a current limited value of $V_{OUT}$ to optocoupler 243. Optocoupler 243 provides isolation and protection from high voltages or rapidly changing voltages that can occur between $V_{OUT}$ and terminal 203 of integrated circuit 200. During overload, over current, and light secondary load conditions, $V_{OUT}$ increases, and in response light emitting diode ("LED") 244 provides increasing light energy to the base of phototransistor 245. As the current increases through optocoupler 243, the current flowing from terminal 203 increases. As the current flowing from terminal 203 increases, the operating frequency of control circuit 140 increases to provide regulation of $V_{OUT}$. Resistor 246 limits the current through optocoupler 243 and therefore limits the maximum operating frequency of LLC resonant converter 100.

Resistor 247 provides a current path for terminal 203 to define a minimum operating frequency for LLC resonant converter 100. When integrated circuit 200 powers up and sequences terminal currents, terminal voltages, and operating frequency, resistor 248 and capacitor 249 define soft start parameters, which include a starting frequency and a soft start time.

OCP network 250 defines frequency shift reaction time to control the reaction speed of LLC resonant converter 100. OCP network 250 further facilitates fluent and oscillation free frequency transition to limit the current in primary winding 112. As can be seen, capacitor 254 of OCP network 250 selectively discharges through a path via resistor 252 or through a path via, resistor 256 and diode 258. Resistor 252 defines maximum frequency shift depth during OLP and OCP conditions. Resistor 256 limits the discharge current of capacitor 254 and defines the operating frequency of LLC resonant converter 100 when the frequency is shifted during operation. When terminal 203 is shorted to the power supply ground terminal, diode 258 defines a faster discharge time via resistor 256 than the discharge time via resistor 252.

Figure 3:
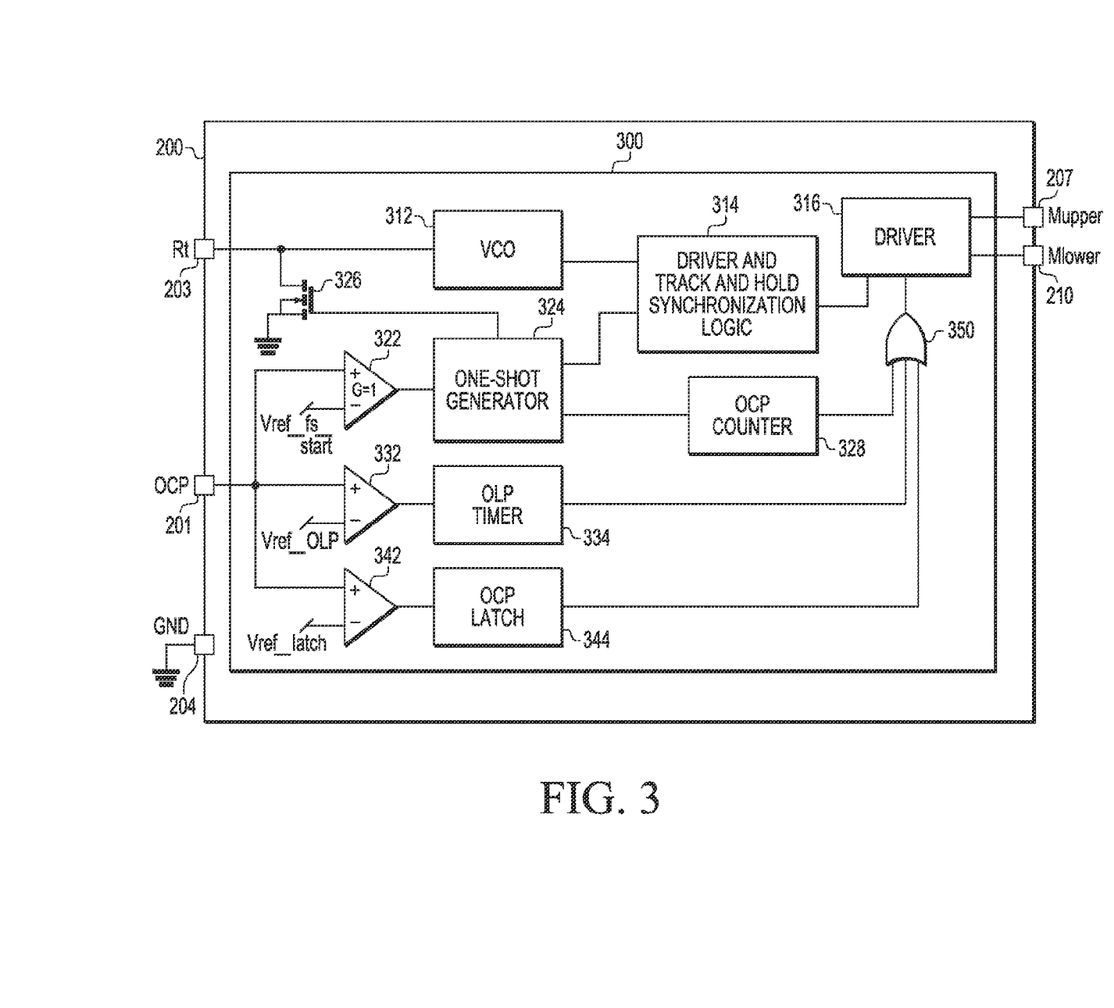
FIG. 3 illustrates in partial block diagram and partial schematic form a portion of the integrated circuit of FIG. 2 including a switching circuit.

FIG. 3 illustrates in partial block diagram and partial schematic form a portion of integrated circuit 200 of FIG. 2 including a switching circuit 300. Switching circuit 300 generally includes a voltage controlled oscillator ("VCO") 312, a driver and track and hold synchronization logic ("DTHS") 314, a driver 316, a first comparator 322, a one shot generator ("OS") 324, a transistor 326, an OCP counter 328, a second comparator 332, an OLP timer 334, a third comparator 342, an OCP latch 344, and an OR gate 350.

VCO 312 has an input connected to terminal 203 and a drain terminal of transistor 326, and an output connected to a first input of DTHS 314. DTHS 314 has a first output connected to a first input of driver 316 and a second output connected to a first input of OS generator 324. Driver 316 has a second input connected to an output of OR gate 350, a first output connected to terminal 207, and a second output connected to terminal 210.

First comparator 322 has a positive input connected to terminal 201, a negative input for receiving a first reference voltage labeled "Vref_fs_start", and an output connected to a second input of OS generator 324. OS generator 324 has a first output connected to a gate terminal of transistor 326, and a second output connected to an input of OCP counter 328. Transistor 326 has a source terminal connected to the power supply ground terminal, OCP counter 328 has an output connected to a first input of OR gate 350.

Second comparator 332 has a positive input connected to terminal 201, a negative input connected to a second reference voltage labeled "Vref_OLP", and an output connected to an input of OLP timer 334. OLP timer 334 has an output connected to a second input of OR gate 350.

Third comparator 342 has a positive input connected to terminal 201, a negative input connected to a third reference voltage labeled "Vref_latch", and an output connected to an input of OCP latch 344. OCP latch 344 has an output connected to a third input of OR gate 350.

In operation, the feedback to logy of VCO 312, DTHS 314, and OS generator 324 opens a track and hold window. As implemented, the duration of the track and hold window automatically decreases with increasing operating frequency. During an overload or over current condition, if the measured voltage or current value on terminal 201 exceeds voltage Vref_fs_start, in response comparator 322 enables OS generator 324. Proportional to the voltage difference between terminal 201 and Vref_fs_start, OS generator 324 responds by providing a gate voltage with an adjustable pulse width to turn on transistor 326. If the voltage difference between terminal 201 and Vref_fs_start is larger than a certain value, OS generator 324 will extend the width of the discharge pulse into a subsequent switching cycle. The time duration of the adjustable pulse width is generally modulated as a linear, or alternately a non-linear response to the current or voltage signal provided at terminal 201.

OS generator 324 and transistor 326 form a discharge network that cooperates with off-chip circuit components. During conduction, on-chip transistor 326 operates as a switch, and internally shorts terminal 203 to ground. Referring back to FIG. 2, capacitor 254 discharges via diode 258 and resistor 256. VCO 312, DIMES 314, and driver 316 cooperate to enable a frequency shift mechanism to provide a higher regulated operating frequency to LLC resonant converter 100 in the next switching cycle. The frequency shift operation is determined on a cycle by cycle basis, based on the value of the current flowing through primary circuit 120. DTHS 314 controls driver 316 and driver 316 alternately drives terminal 207 and terminal 210 with pulse widths to enable the frequency shift of LLC resonant converter 100. If the $V_{OUT}$ feedback signal indicates high ripple, driver 316 can regulate $V_{OUT}$ of secondary circuit 130 as desired. Also, OS 324 provides the discharging pulses to OCP counter 328. After counting a certain number of pulses, OCP counter 328 drives an input of OR gate 350 to a logic one.

During an overload or over current condition, comparator 332 and OLP tinier 334 provide protection without enabling the frequency shift mechanism described above. This protection is useful when precise OLP threshold adjustment is desired without shifting the operating frequency of LLC resonant converter 100. If the measured voltage or current value on terminal 201 exceeds voltage Vref_OLP, which is generally a lower value than Vref_fs_start, in response comparator 332 enables OLP timer 334 to start a count. If OLP timer 334 reaches a certain terminal count, OLP timer 334 drives an input of OR gate 350 to a logic one.

During an over current condition, comparator 342 and OCP latch 344 also provide protection without enabling the frequency shift mechanism described above. This protection is useful to compensate for a smaller frequency shift operation, or a longer reaction time, for LLC resonant converter 100, OCP latch 344 is especially useful for conditions such as a short circuit in secondary circuit 130. If the measured voltage or current value on terminal 201 exceeds voltage Vref_latch, which is generally a higher value than Vref_OLP and Vref_fs_start, in response comparator 342 enables OCP latch 344. OCP latch 344 drives an input of OR gate 350 to a logic one indicating that LLC resonant converter 100 should latch off immediately.

OR gate 350 selectively disables driver 316 as a function of OCP counter 328, OLP timer 334, OCP latch 344. In response, driver 316 stops operation of LLC resonant converter 100 and does not drive terminal 207 and terminal 210 for a certain time (if the voltage on terminal 201 exceeds either Vref_fs_start or Vref_OLP) or until LLC resonant converter 100 is reset (if the voltage on terminal 201 exceeds Vref_latch). In response, integrated circuit 200 initiates an auto recovery phase or will need to be reset, respectively, before resuming normal operation.

Figure 4:
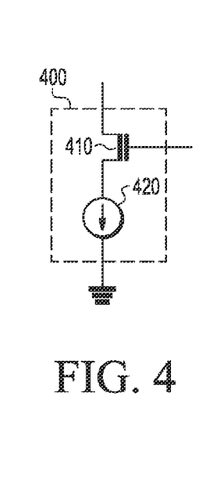
FIG. 4 illustrates in schematic form a switched current sink of the switching circuit of FIG. 3.

FIG. 4 illustrates in schematic form a switched current sink 400 of switching circuit 300 of FIG. 3. Switched current sink 400 generally includes a discharge network transistor 410 and current source 420. Discharge network transistor 410 has a gate terminal connected to the first output of OS generator 324, a drain terminal connected to terminal 203, and a source terminal connected to a first terminal of current source 420. Current source 420 has output second terminal connected to the power supply ground terminal.

In operation, switched current sink 400 provides a switched current source 420 that senses a time based change of voltage, to increase the current flow from terminal 203. The discharge pulse width at the gate terminal of transistor 410 is generally fixed width and linearly modulated (or nonlinearly modulated in an alternative embodiment) based on a voltage level or current sink at terminal 201. By substituting switched current source 400 for transistor 326, a user can more precisely set the responsiveness of the OCP control loop.

Figure 5:
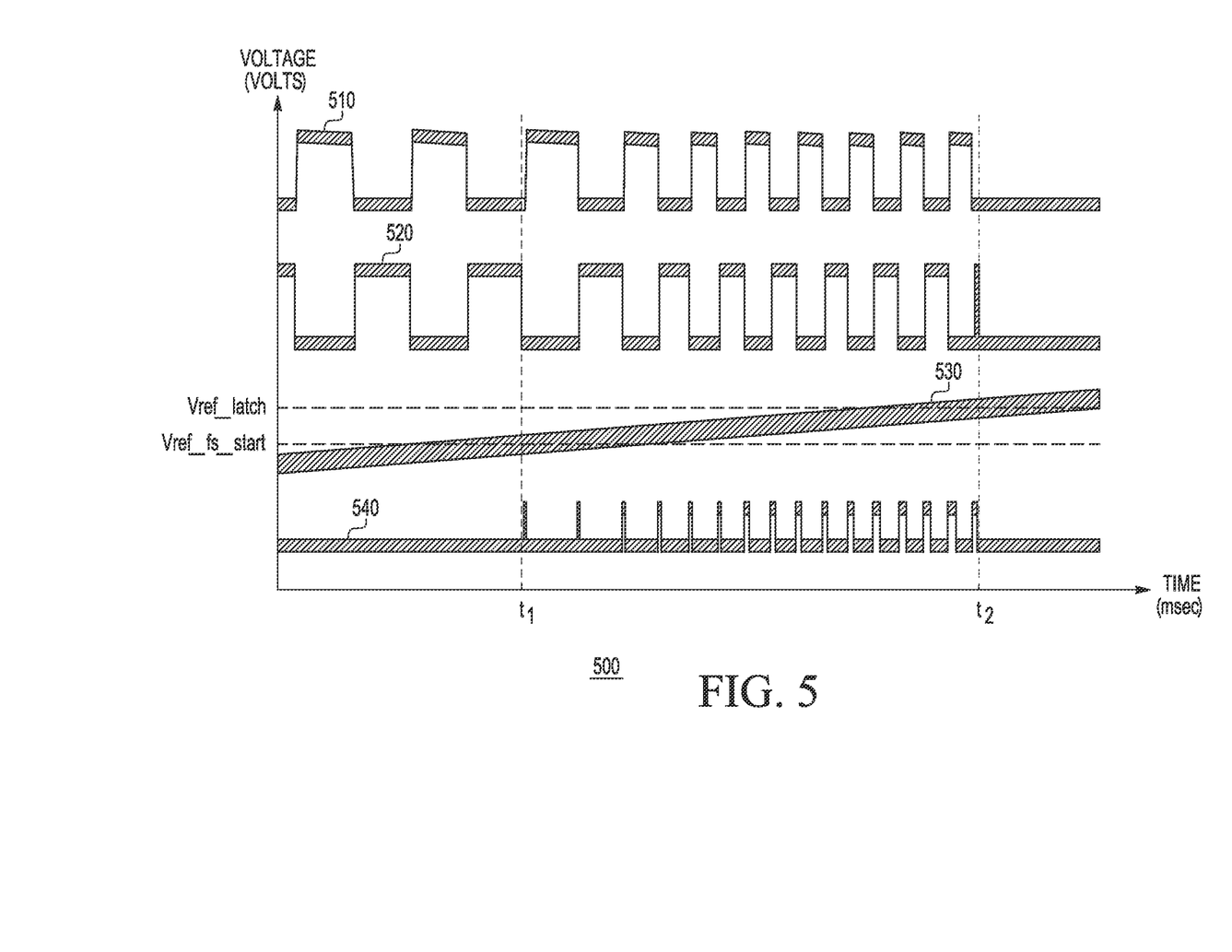
FIG. 5 illustrates a timing diagram including operating waveforms of the LLC resonant converter of FIG. 1.

FIG. 5 illustrates a timing diagram 500 including operating waveforms of LLC resonant converter 100 of FIG. 1. In FIG. 5, the horizontal axis represents time in milliseconds (ms.), and the vertical axis represents voltage in volts. The horizontal axis illustrates two particular times of interest, a time labeled "$t_1$" and a time labeled "$t_2$". The vertical axis illustrates two voltages of interest, reference voltage Vref_latch and reference voltage "Vref_fs_start". Timing diagram 500 includes a waveform 510 representing the voltage of the Mupper signal, a waveform 520 representing the voltage of the Mlower signal, a waveform 530 representing the voltage of terminal 201, and a waveform 540 representing the voltage on the gate of transistor 326. FIG. 5 illustrates variation or ripple in each of the waveforms with cross-hatches.

In operation, waveform 510 represents a drive voltage provided by terminal 207 and waveform 520 represents a drive voltage provided by terminal 210. Operation of LLC resonant converter 100 is shown in milliseconds between time slot $t_1$ and $t_2$. Note that FIG. 5 does not show the operation of comparator 332 and OLP timer 334.

When the voltage at terminal 201 exceeds Vref_fs_start around $t_1$, in response control circuit 140 enables the frequency shift mechanism. The frequency increases on a cycle-by-cycle basis as the voltage at terminal 201 continues to increase. OS 324 increases the discharge pulse width 540 proportional to the increase of the voltage at terminal 201. Under normal conditions, the frequency shifting would keep the primary current regulated and the OCP voltage would stabilize. However under some conditions, such as a short circuit in the load connected to the secondary windings, the voltage at terminal 201 would continue to increase, which is shown in FIG. 5 by waveform 530 between $t_1$ and $t_2$. When the voltage at terminal 201 eventually exceeds Vref_latch at $t_2$, comparator 342 sets OCP latch 344 to latch off LLC resonant converter 100 immediately.

The above-disclosed subject matter is to be considered illustrative, and not restrictive, and the appended claims are intended to cover all such modifications, enhancements, and other embodiments that fall within the true scope of the claims. For example, in the illustrated embodiment, integrated circuit 200 uses 9 pins of a 10 pin package, but in other embodiments integrated circuit 200 could have a greater or lesser number of pins.

In the illustrated embodiment capacitor 254 has a value in a range of about one hundred times lower than the value of capacitor 249, but this relationship could be varied to change the responsiveness of the frequency control loop. Also, resistor 256 or diode 258 could be eliminated. In alternative embodiments, if the capability to include separate soft start and OCP parameter adjustment is less desirable and the soft start period is short, resistor 252 and capacitor 254 could be eliminated and terminal 203 will provide a frequency shift by supplying current to capacitor 249.

Moreover, diode 258 could be replaced by a Schottky discharge diode with lower maximum forward voltage to reduce errors in discharge time caused by temperature variations.

Note that resonant converter 100 could use various types of current and voltage sensors including a charge pump current sensor, a current sense transformer, the auxiliary winding on an off-chip resonant coil, or a standard current sense resistor.

Moreover the voltage level on terminal 201 could be measured only when terminal 210 is provided to tower transistor 124 of LLC resonant converter 100. If desired, the same discharge pulse width could be used in subsequent cycles.

For switching circuit 300, OLP timer 334 could be omitted and OCP counter 328 could be used in place of OLP timer 334.

For switching circuit 300, a rate of change of a current or a voltage of feedback signal terminal 201 could be measured with respect to time, and the frequency of activation of the discharge network could be increased in response to the rate of change of a current or a voltage of feedback signal terminal 201 exceeding a certain rate of change.

For switching circuit 300, a terminal 201 voltage or a terminal 201 current could be sampled within a certain time of providing terminal 207 or terminal 210, on a cycle by cycle, or alternately not on a cycle by cycle basis, in order to compensate for primary current or voltage ripple.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A control circuit for a resonant controller comprising:
    a first controller terminal for providing an upper drive signal;
    a second controller terminal for providing a lower drive signal;
    a third controller terminal for receiving a feedback signal;
    a fourth controller terminal for receiving a current signal indicative of a current in a primary of a transformer; and
    a switching circuit coupled to said first, second, third, and fourth controller terminals and responsive to said feedback signal to determine a frequency at which to provide said upper and lower drive signals, and further responsive to said current signal to change a value of said feedback signal when said current signal exceeds a first threshold, and to stop providing said upper and lower drive signals when said current signal exceeds a second threshold, said second threshold higher than said first threshold.

2. The control circuit of claim 1 wherein said feedback signal is a current, said switching circuit changes said value of said feedback signal by increasing said current, and said switching circuit increases said frequency in response to an increase in said current.

3. The control circuit of claim 1 further comprising an overcurrent protection network, said overcurrent protection network comprising:
    a first resistor having a first terminal coupled to said third controller terminal, and a second terminal;
    a capacitor having a first terminal coupled to said second terminal of said first resistor, and a second terminal coupled to a power supply voltage terminal;
    a second resistor having a first terminal coupled to said third controller terminal, and a second terminal; and
    a diode having a cathode coupled to said second terminal of said second resistor, and an anode coupled to said first terminal of said capacitor.

4. The control circuit of claim 1 wherein said switching circuit comprises:
    a discharge network coupled between said first controller terminal and a reference voltage terminal, wherein said discharge network discharges said feedback signal in response to said current signal exceeding said first threshold.

5. The control circuit of claim 4 wherein said switching circuit activates said discharge network for a predetermined time in response to said current signal exceeding said first threshold.

6. The control circuit of claim 5 wherein said switching circuit modulates said predetermined time non-linearly in response to said current signal.

7. An integrated circuit comprising:
a first pin for receiving a feedback signal;
a second pin for receiving a current signal indicative of a current in a primary of a transformer; and
a switching circuit coupled to said first and second pins and responsive to said feedback signal to determine a frequency at which to provide an upper drive signal and a lower drive signal, and further responsive to said current signal to change a value of said feedback signal when said current signal exceeds a first threshold, and to stop providing said upper and lower drive signals when said current signal exceeds a second threshold, said second threshold higher than said first threshold.

8. The integrated circuit of claim 7 wherein said switching circuit changes said value of said feedback signal by increasing said current, and said switching circuit increases said frequency in response to an increase in said current.

9. The integrated circuit of claim 7 further comprising:
a third pin for providing said upper drive signal; and
a fourth pin for providing said lower drive signal.

10. The integrated circuit of claim 7 wherein a total number of pins of the integrated circuit is less than or equal to ten.

11. The integrated circuit of claim 7 wherein said switching circuit comprises:
a voltage controlled oscillator having an input coupled to said first pin, and an output; and
a driver having an output coupled to said output of said voltage controlled oscillator, and first and second outputs for providing said upper and lower drive signals.

12. The integrated circuit of claim 11 wherein said switching circuit further comprises:
a first comparator having a first terminal coupled to said second pin, a second terminal for receiving said first threshold, and an output terminal; and
a discharge network having a first terminal coupled to said first pin, a second terminal coupled to a reference voltage terminal, and a control terminal coupled to said output terminal of said first comparator, wherein said discharge network discharges said feedback signal in response to said current signal exceeding said first threshold.

13. The integrated circuit of claim 12 wherein said switching circuit further measures a rate of change of said current signal with respect to time, and increases a frequency of activation of said discharge network in response to said rate of change exceeding a predetermined rate of change.

14. The integrated circuit claim 12 wherein said discharge network comprises a switch.

15. The integrated circuit of claim 12 wherein said discharge network comprises a switched current sink.

16. The integrated circuit of claim 11 wherein:
said driver further has a second input for receiving a disable signal; and
said switching circuit further comprises an overcurrent protection circuit having an input coupled to said second pin, a second input for receiving said first threshold, and an output coupled to said second input of said driver.

17. The integrated circuit of claim 16 wherein said overcurrent protection circuit counts a number of times said current signal exceeds said first threshold, and in response to said number of times, either stops providing said upper and lower drive signals for a predetermined time, or stops providing said upper and lower drive signals until the integrated circuit is reset.

18. The integrated circuit of claim 7 wherein said switching circuit measures said current signal only when providing said lower drive signal.

19. A method of operating a resonant converter comprising:
determining a frequency at which to provide first and second drive signals in response to a feedback signal;
activating said first and second drive signals alternately at said frequency;
receiving a current signal indicative of a current in a primary of a transformer at a first terminal;
comparing said current signal to a first threshold;
selectively increasing said frequency if said current signal exceeds said first threshold;
comparing said current signal to a second threshold larger than said first threshold; and
stopping said activating if said current signal is larger than said second threshold.

20. The method of claim 19 wherein said receiving said current signal at said first terminal comprises receiving said current signal at a pin of a controller chip.

* * * * *

UNITED STATES PATENT AND TRADEMARK OFFICE
CERTIFICATE OF CORRECTION

PATENT NO. : 8,755,199 B2
APPLICATION NO. : 13/527800
DATED : June 17, 2014
INVENTOR(S) : Roman Stuler Page 1 of 1

It is certified that error appears in the above-identified patent and that said Letters Patent is hereby corrected as shown below:

In the Specification

Column 1, line 48, replace "Hock" with "block".

Column 2, line 2, replace "140, drain" with "140, a drain".

Column 2, line 50, replace "toad" with "load".

Column 3, line 64, replace "alight" with "a light".

Column 4, line 17, replace "in" with "In".

Column 5, line 10, replace "via," with "via".

Column 5, line 42, replace "terminal," with "terminal.".

Column 5, line 54, replace "to logy" with "topology".

Column 6, line 9, replace "DIMES" with "DTHS".

Column 6, line 24, replace "tinier" with "timer".

Column 6, line 39, replace "100," with "100.".

Column 6, line 48, replace "334, OCP" with "334, or OCP".

Column 8, line 2, replace "tower" with "lower".

Signed and Sealed this
Twenty-eighth Day of October, 2014

Michelle K. Lee
*Deputy Director of the United States Patent and Trademark Office*